United States Patent
Anderson

(10) Patent No.: US 11,647,741 B2
(45) Date of Patent: May 16, 2023

(54) DEVICE FOR HOLDING FISHING RODS AND THE LIKE

(71) Applicant: Gary Anderson, Denmark, WI (US)

(72) Inventor: Gary Anderson, Denmark, WI (US)

( * ) Notice: Subject to any disclaimer, the term of this patent is extended or adjusted under 35 U.S.C. 154(b) by 0 days.

(21) Appl. No.: 16/917,321

(22) Filed: Jun. 30, 2020

(65) Prior Publication Data

US 2021/0400941 A1 Dec. 30, 2021

(51) Int. Cl.
*A01K 97/10* (2006.01)

(52) U.S. Cl.
CPC .................................. *A01K 97/10* (2013.01)

(58) Field of Classification Search
CPC .................. A01K 97/10; A45F 2200/0566
USPC .................... 43/21.2; 248/514, 515
See application file for complete search history.

(56) References Cited

U.S. PATENT DOCUMENTS

| | | | | |
|---|---|---|---|---|
| 122,370 A * | 1/1872 | Doolittle | ............... | A01K 97/10 248/515 |
| 123,380 A * | 2/1872 | Clarke | ................... | A01K 97/10 248/515 |
| 1,856,477 A * | 5/1932 | Gerline | ................... | A01K 97/10 43/15 |
| 2,301,885 A * | 11/1942 | Lachr | ..................... | A01K 97/10 248/515 |
| 3,601,919 A * | 8/1971 | Nixon | ..................... | A01K 97/10 43/21.2 |
| 4,932,152 A * | 6/1990 | Barlotta | ................. | A01K 97/10 248/515 |
| 5,054,737 A * | 10/1991 | DeLancey | ............... | A01K 97/10 248/515 |
| 5,062,179 A * | 11/1991 | Huang | ................. | E05D 11/1007 16/436 |
| 5,142,809 A * | 9/1992 | O'Brien | ................. | A01K 97/10 248/514 |
| 5,438,789 A * | 8/1995 | Emory | ................... | A01K 97/10 248/514 |
| 5,588,630 A * | 12/1996 | Chen-Chao | ............. | F16C 11/10 248/514 |
| 5,836,327 A * | 11/1998 | Davis | ..................... | A45B 11/00 135/16 |
| 6,591,541 B1 * | 7/2003 | Cummings | ............ | A01K 97/10 248/514 |
| 7,114,281 B2 * | 10/2006 | Miller | ..................... | A01K 97/10 43/21.2 |
| 7,232,099 B1 * | 6/2007 | Wilcox | ................. | B63B 25/002 248/228.1 |
| 7,743,548 B1 * | 6/2010 | Cashaw | ................. | A01K 97/11 43/21.2 |
| D658,480 S * | 5/2012 | Pratt | ............................. | D8/349 |
| 10,258,026 B2 * | 4/2019 | Thomas | ............ | F16M 11/2014 |
| 11,079,064 B1 * | 8/2021 | Cifers | ................ | F16M 11/2092 |
| 2001/0046409 A1 * | 11/2001 | Fischer | ................... | B60R 11/02 403/92 |
| 2003/0089021 A1 * | 5/2003 | Miller | ..................... | A01K 97/10 43/21.2 |

(Continued)

*Primary Examiner* — Yvonne R Abbott-Lewis
(74) *Attorney, Agent, or Firm* — von Briesen & Roper, s.c.

(57) ABSTRACT

This invention relates to an improved holder for a fishing rod. typical fishing rod holders are difficult to quickly and accurately adjust. Some even require the use of a tool to adjust. The claimed invention teaches a rod holder with a convenient adjustment mechanism that allows a user to adjust the angle of the rod holder in two planes without the use of a tool and with only one hand.

8 Claims, 14 Drawing Sheets

(56) References Cited

U.S. PATENT DOCUMENTS

2019/0335735 A1* 11/2019 Serocki ................. F15B 15/065
2020/0029544 A1* 1/2020 Draper ................... A01K 97/10
2020/0037593 A1* 2/2020 Kinnin ................... A01K 97/10
2020/0037594 A1* 2/2020 Lohmeier ............... A01K 97/10
2020/0100486 A1* 4/2020 McMenamy .......... A01K 97/10

* cited by examiner

DEVICE FOR HOLDING FISHING RODS AND THE LIKE

FIELD OF THE INVENTION

This invention relates to an improved holder for a fishing rod. More specifically, this invention relates to an adjustable pivoting fishing rod holder assembly.

BACKGROUND OF THE INVENTION

Typical fishing rod holders are difficult to quickly and accurately adjust. Some even require the use of a tool to adjust. The claimed invention teaches a rod holder with a convenient adjustment mechanism that allows a user to adjust the angle of the rod holder relative to the horizontal and relative to the vertical without the use of a tool and with only one hand. The claimed invention is therefore a significant advance in convenience to fisherman.

DETAILED DESCRIPTION OF THE INVENTION

Figure 1:
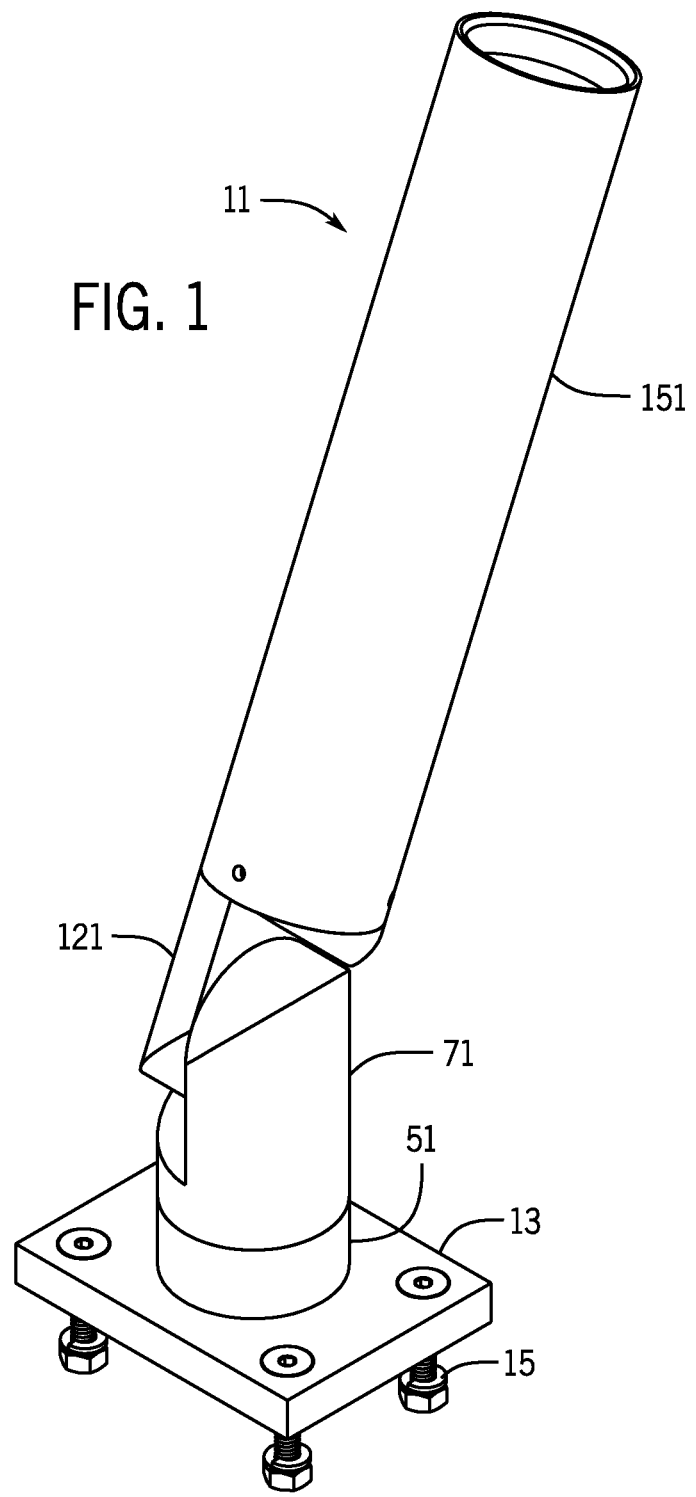
FIG. 1 shows a front and side perspective view of the rod holder assembly used with solid base mount.

Now referring to the drawings in detail wherein like reference numerals refer to like elements throughout, FIGS. 1-4 show several embodiments of the rod holder assembly 11 constructed in accordance with the claimed invention. FIG. 1 shows the rod holder assembly mounted to a solid mount base 13. Solid mount base 13 is typically fixed to, as an example, the upper portion of the gunwale of a vessel (not shown) by screws 15 or other fasteners. The rod holder assembly of the claimed invention can be installed on a vessel in a number of ways including using the solid base mount shown in FIG. 1.

Figure 2:
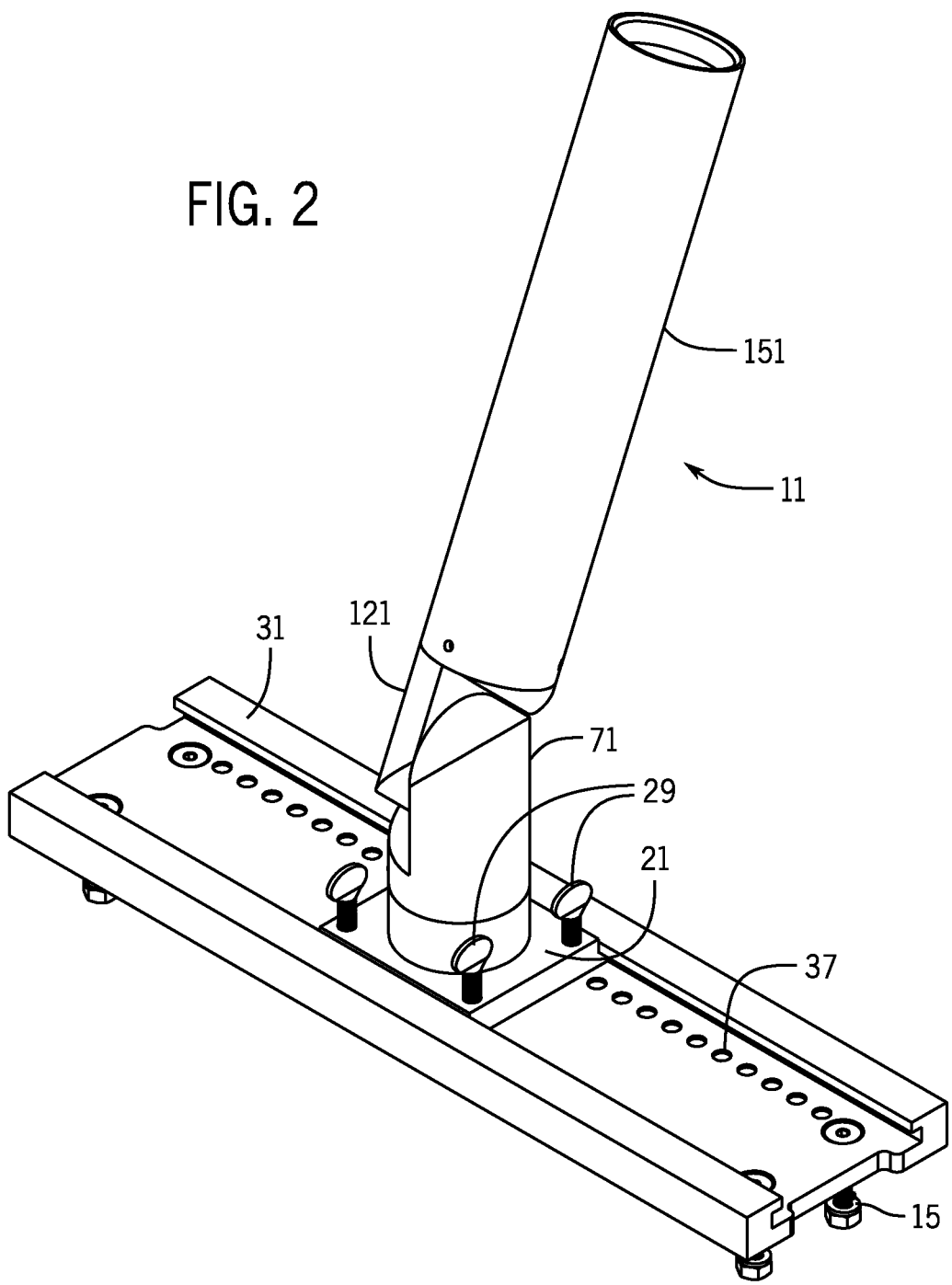
FIG. 2 shows a front and side perspective view of the rod holder assembly used with a track mount base.

Additional methods for mounting the rod holder 11 include the use of the track system as shown in FIG. 2 and FIG. 6. As shown in FIG. 2, rod holder assembly 11 is mounted on track mounting plate 21. As shown in FIG. 6C, track mounting plate 21 is generally rectangular in construction and comprises a raised center section 23. As shown in FIGS. 6C and 6D, track mounting plate 21 further comprises a wing section 25 on opposing sides with a smaller cross section than the raised center section 23. Track mounting plate 21 further comprises a set of thumb screw apertures 27 towards to corners of the center raised section 23.

Figure 6A:
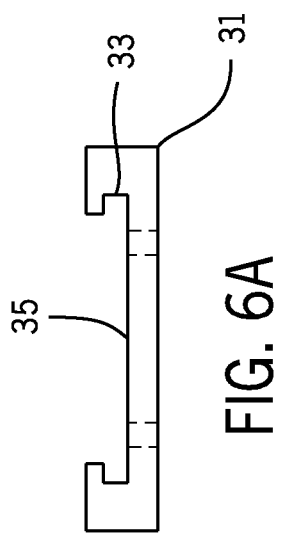
FIG. 6A shows an end elevational view of the track base of the rod holder assembly.
Figure 6B:
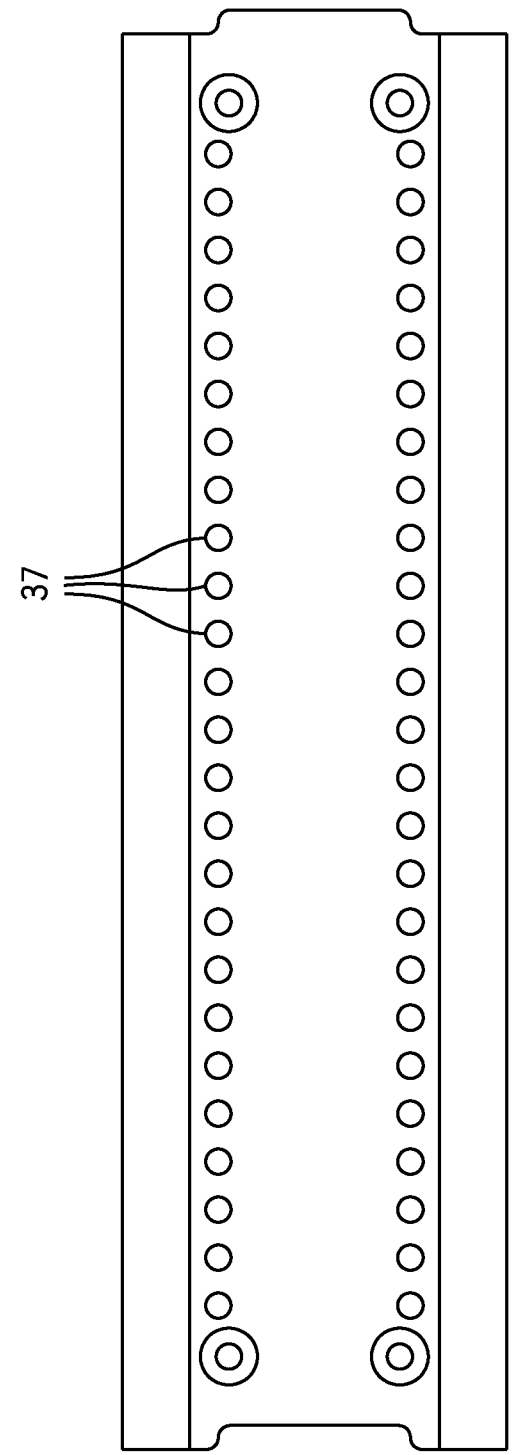
FIG. 6B shows a top elevational view of the track base of the rod holder assembly.
Figure 6C:
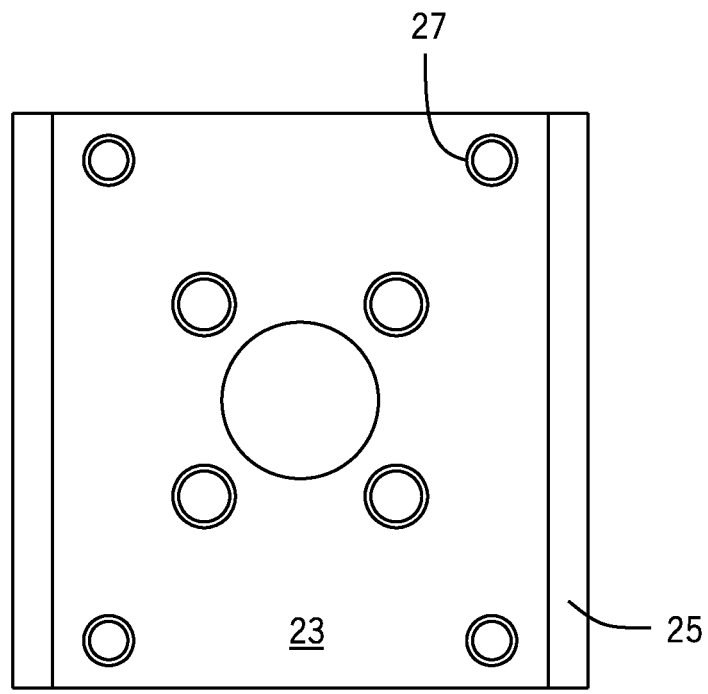
FIG. 6C is a top elevational view of the track mounting plate used in connection with the track base.
Figure 6D:
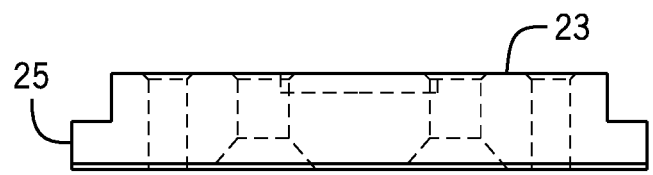
FIG. 6 D is a side elevational view of the track mounting plate used in connection with the track base.

Base track 31 shown in FIG. 6A is sized to compliment track mounting plate 21 with elongated slots 33 to accommodate the wing sections 25 of the track mounting plate 21 and a narrower section 35 to confine the track mounting plate 21 within the base track 31. Base track 31 is typically mounted to the gunwale of a boat (not shown) using screws or other conventional fasteners 15. Base track 31 further comprises a plurality of regularly spaced apertures 37. Thumb screws 29 in thumb screw apertures 27 are tightened down so as to secure the track mounting plate 21 in the regularly spaced apertures 37 in the base track so as to fix the track mounting plate 21 in place relative to the base track 31.

Figure 3:
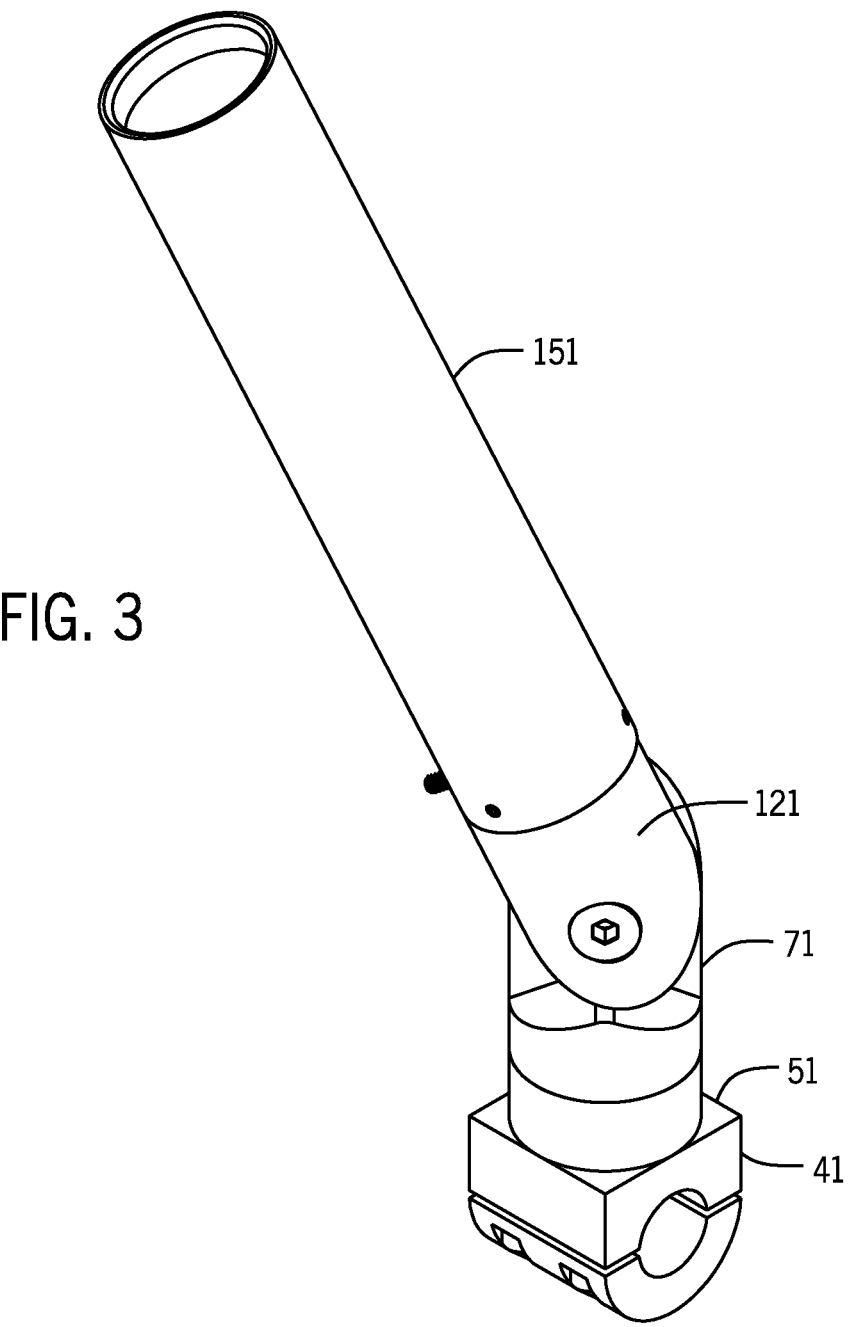
FIG. 3 shows a front and side perspective view of rod holder assembly used with a clamp mount.
Figure 4:
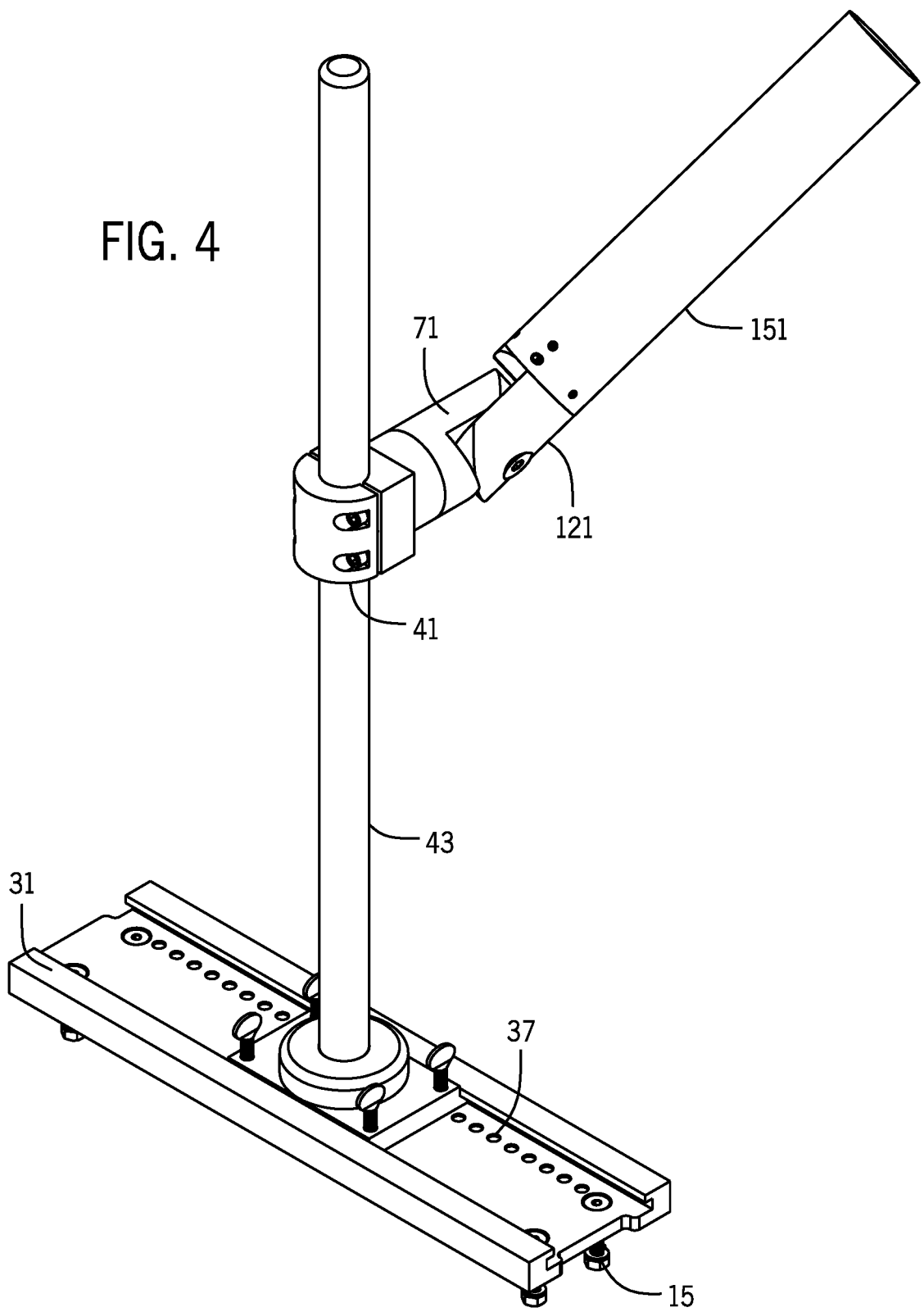
FIG. 4 shows a front and side perspective view of the rod holder assembly used with a tree mount and track base.
Figure 5:
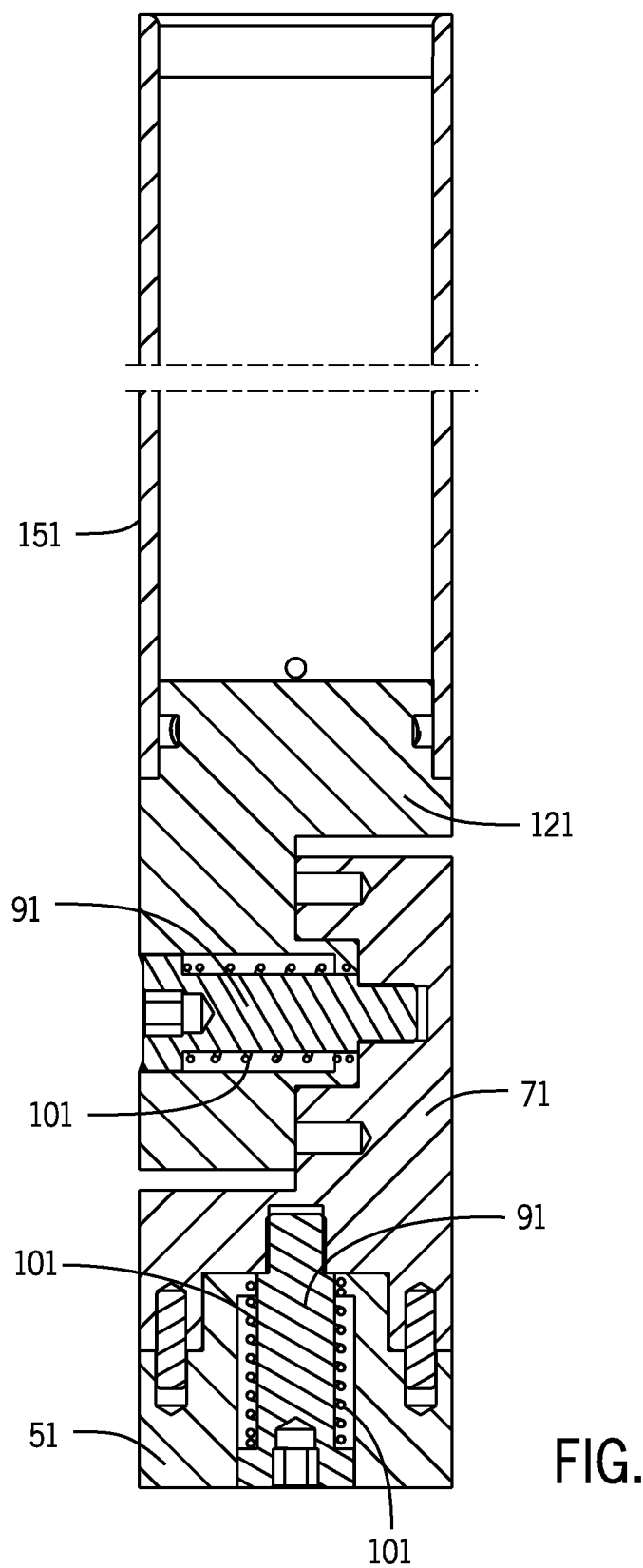
FIG. 5 shows a cross sectional view of the rod holder assembly.
Figure 7A:
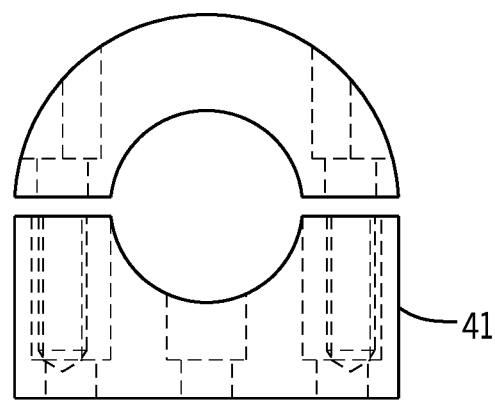
FIG. 7A shows a side elevational view of a rail clamp assembly used in connection with the invention.
Figure 7B:
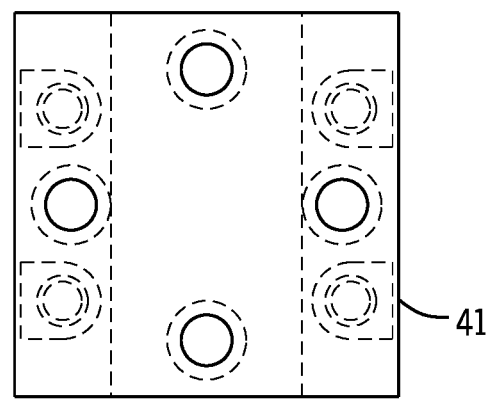
FIG. 7B shows a side elevational view of the rail clamp assembly used in connection with the invention.
Figure 8A:
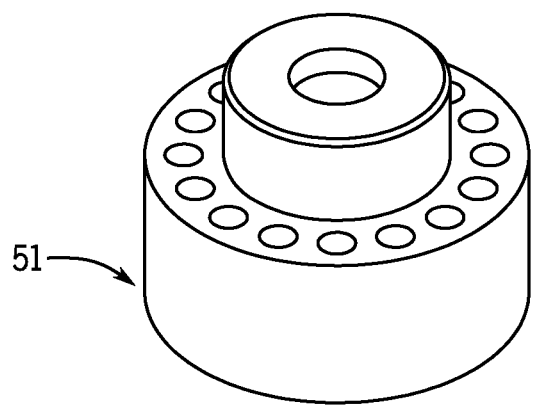
FIG. 8A shows a top and side perspective view of the rod holder base.
Figure 8B:
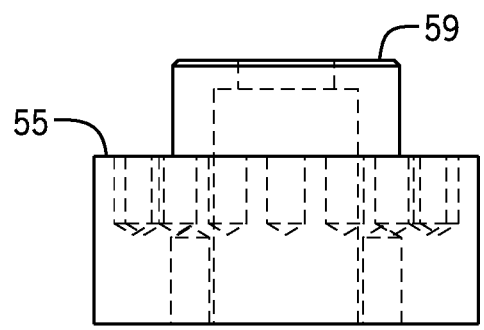
FIG. 8B shows a side phantom elevational view of the rod holder base.
Figure 8C:
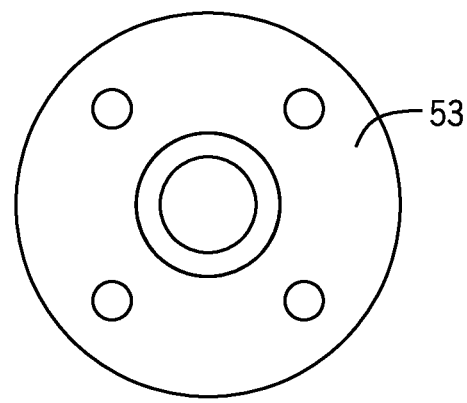
FIG. 8C shows a bottom elevational view of the rod holder base.

Now referring to FIG. 3, which shows the rod holder assembly in combination with a rail clamp assembly 41. As shown in FIG. 7, rail clamp assembly 41 is of relatively standard design. Referring now to FIG. 4, an embodiment of the invention is shown with that employs both the track system 20 and a vertically extending pole 43 upon which a clamp assembly 41 is mounted.

As shown in FIGS. 1-5, moving upwardly from mounting plate rod holder base 51, rod holder base 51 comprises a lower surface 53 that is fixed to the solid mount base 13, the track mounting plate 21 or the rail clamp assembly 41 and an upper area comprising a lower annular tier 55 and an upper annular tier 59. Lower annular tier 55 further comprises a plurality of regularly spaced apertures 57 arranged at regular intervals around the circumference of the lower annular tier 55. Rod holder base 51 further comprises a central aperture 61 that extends from the upper tier 59 through to the lower surface 53 of the rod holder base 51 and further comprises shoulder 63.

Figure 9A:
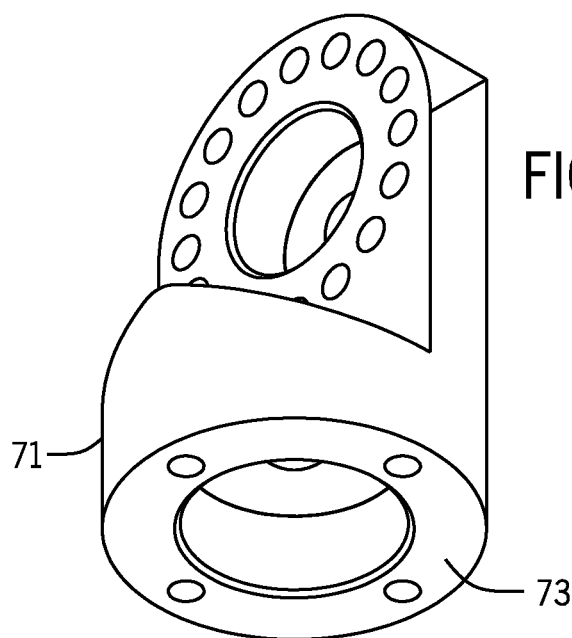
FIG. 9A is a top and side perspective view of the rod holder mid base.
Figure 9B:
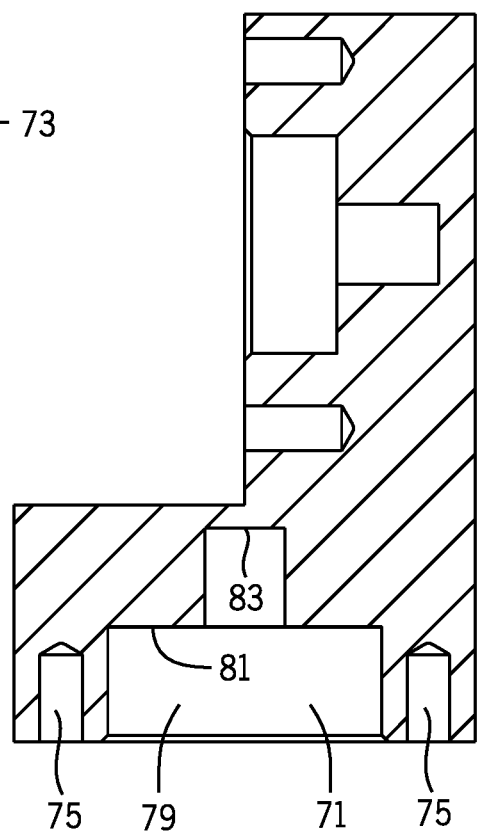
FIG. 9B is a side phantom view of the rod holder mid base.
Figure 9C:
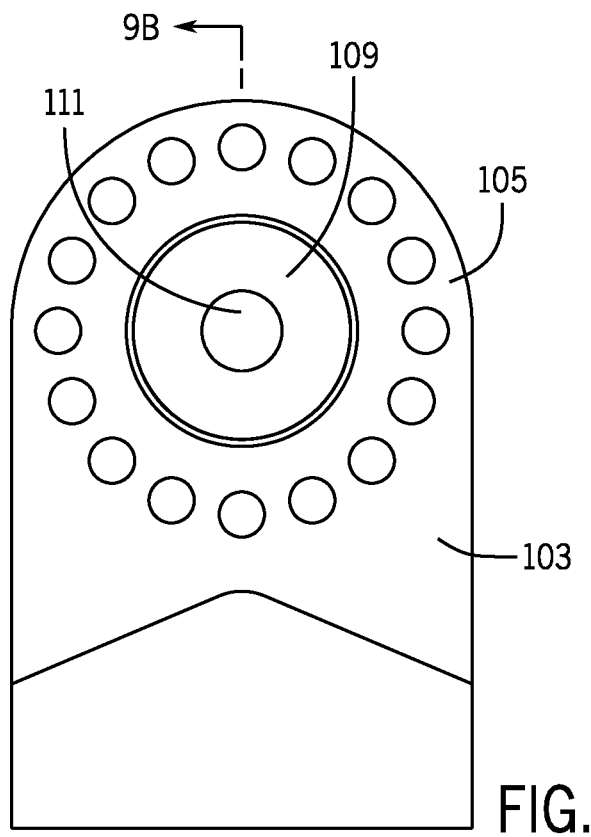
FIG. 9C is a side elevational view of the rod holder mid base.

Now referring to FIGS. 9A-9C, rod holder mid base 71 comprises an annular lower surface 73 comprising a plurality of regularly spaced apertures 75. Dowel pins 77 are placed in apertures 75 and may be fixed in place in apertures 75. Dowel pins or protrusions 77 protrude outwardly from apertures 75 and are sized so as to fit within the apertures 57 around the circumference of the lower tier 55 of the pivot base 51. Rod holder mid base 71 further comprises an aperture 79 comprising a first shoulder portion 81 and an inner threaded portion 83.

Figure 10A:
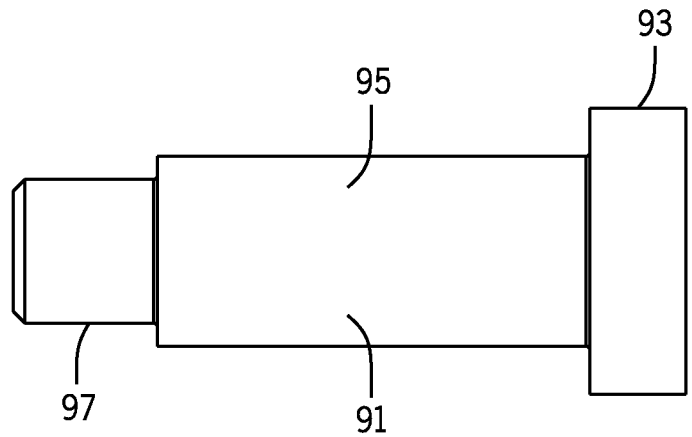
FIG. 10A shows a side elevational view of the center pin.
Figure 10B:
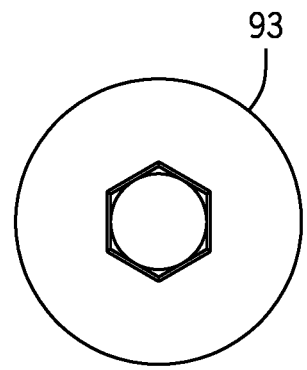
FIG. 10B shows an end elevational view of the center pin.
Figure 11A:
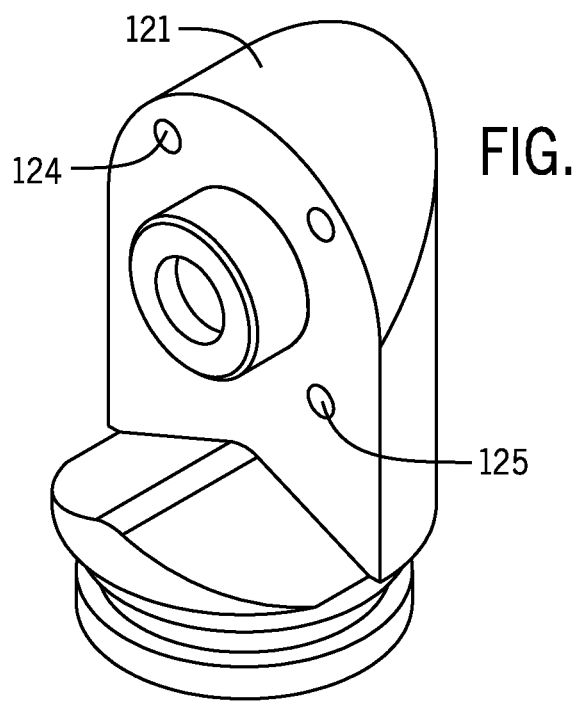
FIG. 11A shows a top and side perspective view of the upper body rod holder.
Figure 11B:
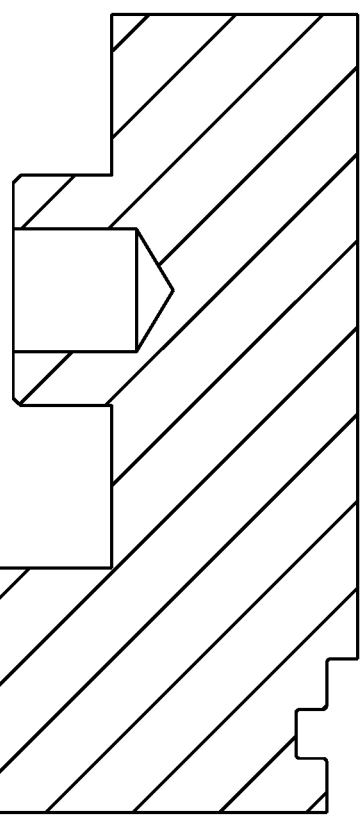
FIG. 11B shows a side cross-sectional view of the upper body rod holder.
Figure 11C:
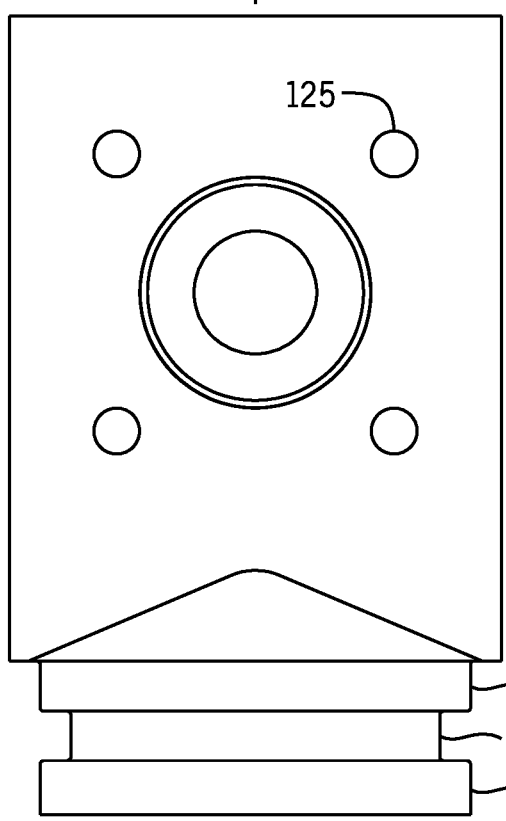
FIG. 11C shows a side elevational view of the upper body rod holder.
Figure 11D:
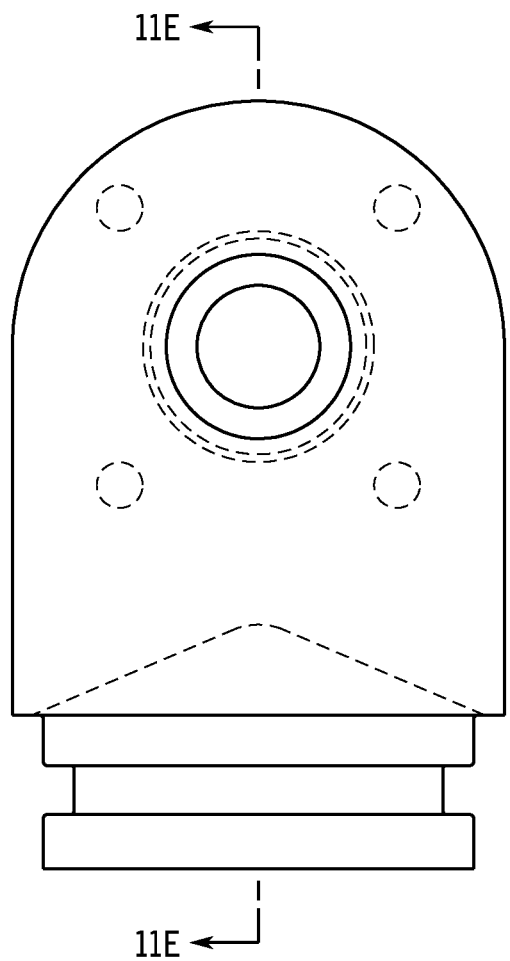
FIG. 11D shows a side elevational view of the upper body rod holder.
Figure 11E:
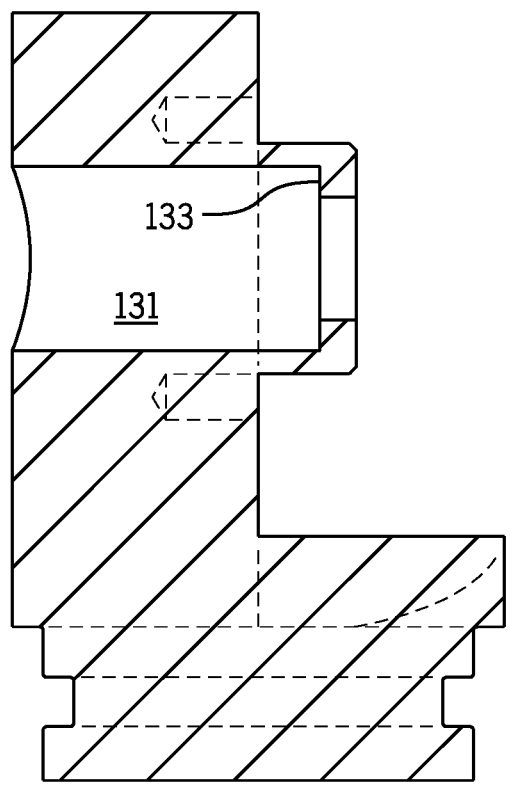
FIG. 11E shows a cross sectional view of the upper body rod holder along line C-C in FIG. 11D.
Figure 12:
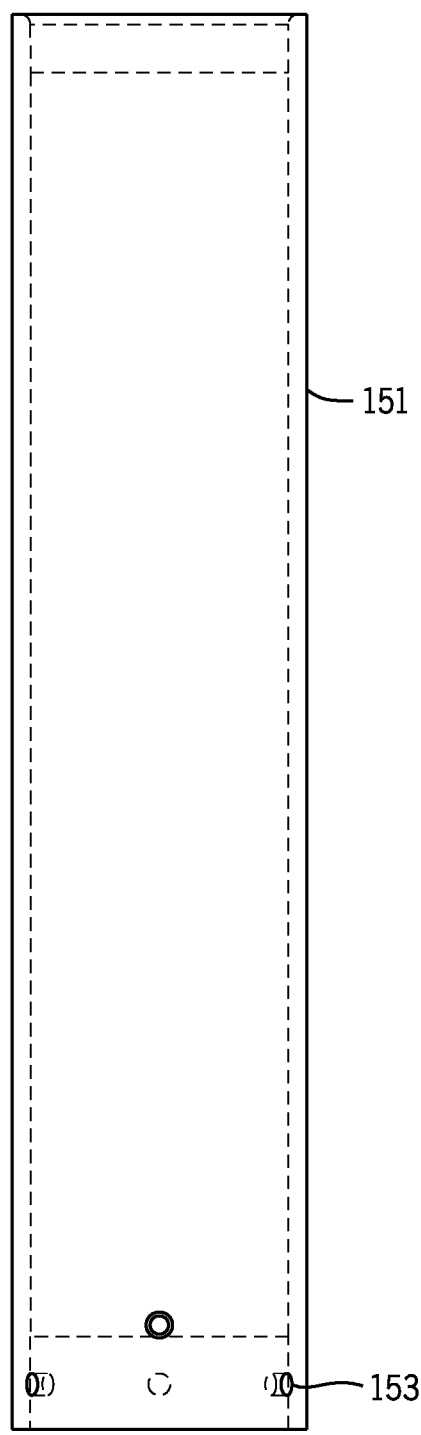
FIG. 12 shows a side elevational view of the rod holder tube.

Referring now to FIG. 10, which shows center pin 91 comprising head portion 93 and elongate pin section 95 including a threaded portion 97. As shown in more detail in FIG. 5, spring 101 is inserted over elongate pin section 95. Center pin 91 and spring 101 are then inserted in rod holder base 51 before rod holder base 21 is affixed to, as an example, solid mount base 13. Threaded section 97 of center pin 91 is threaded into rod holder mid base 71 and spring 101 is captured between head portion 93 of center pin 91 and shoulder 63 of rod holder base 51.

Rod holder midbase 71 further comprises a lower elbow 103, which is generally situated orthogonally to the lower surface 73. Lower elbow 103 comprises an upper annular tier 105 surrounding a lower annular tier 109. Upper annular tier 105 further comprises a plurality of apertures 107 arranged in a circle and situated along the upper annular tier 105. Lower tier 109 further comprises a threaded central aperture 111. Rod holder mid base 71 can be adjusted rotationally relative to rod holder base 21 by pulling upwardly on rod holder mid base 71 against spring 101 such that dowel pins 77 clear the apertures 59 in the rod holder base 51, rotating rod holder mid base 71 and allowing spring 101 pressure to secure dowel pins or protrusions 77 in different apertures 59 in the rod holder base 21.

Upper body rod holder 121 comprises a first tier 123 with a plurality of apertures 125 and dowel pins 47 protruding outwardly from said apertures to form protrusion 127 and an opposite side comprising a central aperture 131 and shoulder 133. Dowel pins 47 are generally permanently affixed within the plurality of apertures 125 to create protrusions 127. Upper body rod holder 121 further comprises a second portion attachable to rod holder tube 161. Second portion of upper rod body holder 121 is generally circular and comprises a first circular protrusion 143, a second slightly smaller circular protrusion 145 and a third circular protrusion 147 similar or identical in size the first circular protrusion 143, the circular protrusions being concentric so as to create a groove between the first circular protrusion 143 and the third circular protrusion 147.

Elbow Center pin 91 comprises a head portion 93 and an elongated portion 95 that further comprises a threaded portion 97. Threaded portion 97 of elbow center pin 91 is threaded into threaded central aperture 11 in lower elbow of rod holder mid base 111. Elbow spring 101 is situated between head portion of elbow center pin 91 and shoulder 133 of upper elbow.

Rod holder tube 151 is a cylindrical tube comprising a pair of threaded apertures 155 toward one end 153. Screws 157 inserted through apertures 155 in the end 153 of the rod holder tube 151 secure the rod holder tube 151 between the first circular protrusion 143 and the third circular protrusion 147. Rod holder tube 151 is open at one end to allow insertion of the end of a fishing rod.

In practice, the angle of rod holder tube 151 and the upper body rod holder 121 is adjustable relative to the rod holder mid base 71 by pulling the upper body rod holder 121 and rod holder tube 151 away from the rod holder mid base 71 such that the protrusions 127 clear the plurality of apertures 75 in the rod holder mid base 71 and then adjusting the angle of the rod holder tube 151 and the upper body rod holder 121. Once the rod holder tube 151 has been adjusted to a satisfactory angle, the elbow spring 101 will urge the upper body rod holder 121 towards the rod holder mid base 71 such that protrusions 127 enter different apertures 75 in the rod holder mid base 71.

The angle of the rod holder tube can therefore be easily moved using one hand in two planes of motion. The rod holder can also be usefully employed to secure cupholders and other fishing equipment.

While the invention has been described with reference to a specific embodiment, the description is illustrative of the invention and is not to be construed as limiting. Various modifications and applications of the invention may occur to those with skill in the art without departing from the spirit and scope of the invention.

What is claimed is:

1. A fishing rod holder that is adjustable in two planes comprising:
   a base assembly;
   a rod holder base;
   a rod holder mid base that is rotatable relative to the rod holder base in a first plane and is fixable to the rod holder base in said first plane of rotation;
   a spring, the spring, being operable to bias the rod holder base and rod holder mid base toward one another whereby the rod holder mid base can be adjusted rotationally by pulling the rod holder mid base away from rod holder base and rotating the rod holder mid base relative to the rod holder base;
   an upper body rod holder that is rotatable relative to the rod holder mid base in a second plane that is orthogonal to the first plane of rotation between the rod holder base and the rod holder mid base and that may be fixed to the rod holder mid base;
   a rod holder tube attached to the upper body rod holder.

2. The fishing rod holder of claim 1 wherein the base assembly comprises a track and the rod holder base may be moved along the track and secured at more than one position along the track.

3. The fishing rod holder of claim 1 wherein the base assembly comprises a clamp and the rod holder base is attached to the clamp.

4. The fishing rod holder of claim 1 wherein the base assembly comprises a track and a pole and the pole may be moved along the track and secured at more than one position along the track; a clamp that may be attached along the length of the pole wherein the rod holder base is attached to the clamp.

5. The fishing rod holder of claim 1 wherein the rod holder base further comprises an annular tier having a plurality of regularly spaced apertures and the rod holder mid base comprises an lower surface with a plurality of protrusions and the protrusions on the annular lower surface of the rod holder mid base fit within the regularly spaced apertures in the annular tier of the rod holder base fit but can be removed such that the rod holder mid base can be rotated in a first plane of rotation relative to the rod holder base.

6. The fishing rod holder of claim 1 wherein the rod holder mid base further comprises an annular tier with a plurality of regularly spaced apertures and the upper body rod holder comprises a lower surface with a plurality of protrusions and the protrusions on the lower surface of the upper body rod holder fit within the regularly space apertures in the rod holder mid base be can be removed such that the upper body rod holder can be rotated in a second plane of rotation relative to the rod holder mid base.

7. The fishing rod holder of claim 6 wherein the rod holder mid base and the rod holder upper base are resistibly secured to each other using a spring biased to maintain the rod holder mid base and the rod holder upper base in close proximity.

8. A fishing rod holder that is adjustable in two planes comprising:
- a base assembly;
- a rod holder base comprising an annular tier having a plurality of regularly spaced apertures;
- a rod holder mid base that is rotatable relative to the rod holder base in a first plane and is fixable to the rod holder base in said first plane of rotation, the rod holder mid base further comprising a lower surface with a plurality of protrusions and the protrusions on the annular lower surface of the rod holder mid base fit within the regularly spaced apertures in the annular tier of the rod holder base
- a spring operable to bias the rod holder base and rod holder mid base towards one another, wherein the rod holder mid base can be adjusted rotationally by pulling the rod holder mid base away from rod holder base and rotating said rod holder;
- an upper body rod holder that is rotatable relative to the rod holder mid base in a second plane that is orthogonal to the first plane of rotation between the rod holder base and the rod holder mid base and that may be fixed to the rod holder mid base;
- a rod holder tube attached to the upper body rod holder.

\* \* \* \* \*